Patented Apr. 5, 1938

2,113,029

UNITED STATES PATENT OFFICE 2,113,029

DYEING

Eugene A. Markush, Jersey City, N. J., assignor to Pharma Chemical Corporation, New York, N. Y., a corporation of New York No Drawing. Application January 25, 1934, Serial No. 708,319½

4 Claims. (Cl. 8—5)

My invention relates to new coloring compounds and refers particularly to coloring compounds which are valuable for the printing or dyeing of cellulose fibers.

The compounds of my invention are obtainable by combining diazo compounds of aromatic monoamines and their substitution products, but which do not contain a sulfonic group, with the acetoacetyl-naphthylamines having the formula

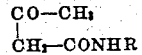

in which R is a naphthalene ring which may contain ethoxy, alkyl, halogen, or nitro group, or groups, but not a solubilizing acid group such as carboxylic or sulfonic groups.

The acetoacetyl-naphthylamines may be produced by condensing the naphthylamines, or their substituted compounds, with an alkyl-acetoacetate, as methyl-acetoacetate and ethyl-acetoacetate.

The compounds of my invention may be produced either in substance or upon the fiber, the latter being capable of accomplishment by impregnating the fiber with the acetoacetyl-naphthylamine compound and then treating the thus impregnated fiber with the diazo compound, or by mixing the diazo-compounds in their stabilized form with the acetoacetyl naphthylamine compound, applying it to the fiber and treating the applied mixture with an acid reaction.

I give the following as one method for the production of one of the compounds of my invention in substance:—

Example 1

Fifteen parts of para-amino-acetanilid are diazotized in the usual manner and neutralized with a solution of sodium acetate.

Twenty-six parts of acetoacetyl-β-naphthylamine are suspended in 500 parts of water at 40° C., and a cold solution containing 7 parts of caustic soda is added. This solution is then cooled to 8° C. by addition of ice and neutralized or made slightly acid with dilute acetic acid. 75 parts of sodium acetate solution in 500 parts of water are then added.

The diazotized para-amino-acetanilid solution is then added slowly to the solution of acetoacetyl-β-naphthylamine under continuous agitation and the whole stirred for about two hours.

Three parts of a sodium hydroxide solution are then added to it very slowly and agitated for another hour. The insoluble color is then filtered, washed well to neutrality with water and dried.

I give the following as one method of developing one of the compounds of my invention upon the fiber:—

Example 2

Eleven parts of the sodium salt of 4-chlor-2-diazo-imino-proline-anisol, 9 parts acetoacetyl-naphthylamine are thoroughly mixed and the mixture employed as follows:—

Two parts of the above mixture are dissolved in 7 parts water, ½ part ammonium ricinoleate, 1½ parts caustic soda solution 30 Bé., 2½ parts Cellosolve or denatured alcohol and the resulting solution thickened to a paste with 15 parts starch-gum tragacanth. This paste is printed on the cotton cloth and hung up to dry. The printed cloth may be developed immediately after drying, or the dried printed cloth stored until required by the printer. The developing is accomplished by placing the cloth in an ager and steaming in the presence of acetic or formic acid vapor for five minutes. It is then soaped hot, rinsed well and dried.

Where the use of an ager is inconvenient, the developing may be done by immersing the printed cloth in a warm bath of a mixture of acetic and formic acids in the presence of Glauber's salt. This developing bath is heated until the shades have reached maximum fullness. Furthermore, the printed material may be padded with the acid mixture using the well known padding method after which the material is dried with heat, rinsed, soaped, washed well and dried.

I give the following as one method of employing the stabilized form of one of the compounds of my invention upon the fiber:—

Example 3

One mole of chlor-anisol-diazo-imino-alpha-pyrrolidine-carboxylic acid and one mole of acetoacetyl-naphthylamine are thoroughly mixed together, printed upon the fiber and developed as described in Example 2.

Other stabilized forms of my compounds may be employed instead of alpha-pyrrolidine carboxylic acid such as those produced from amino-sulfo-benzoic acid, methyl-glycocoll, diglycolamine, amino-pyridine-carboxylic acid.

Among the shades of colors producible by my invention, I mention the following:—

| Diazotized amine | Coupling component | Shade |
|---|---|---|
| 2,5 dichloro-aniline | Acetoacetyl-α-naphthylamine. | Yellow. |
| p-Nitro-toluidine | Acetoacetyl-β-naphthylamine. | Do. |
| p-Amino-phenyl-benzyl-ether | Acetoacetyl-α-naphthylamine. | Greenish yellow. |
| Chloranisidine | Acetoacetyl-chlor-β-naphthylamine. | Do. |
| Chloranisidine | Acetoacetyl-α-naphthylamine. | Do. |

I do not limit myself to the particular chemicals, quantities, times, temperatures or steps of procedure as set forth as these are given simply as a means for clearly explaining my invention.

What I claim is:—

1. The method of dyeing a cellulosic material which comprises impregnating the material with a basic paste containing a water-soluble diazo-imino derivative of aniline and a non-substantive aceto-acetyl-naphthylamine and subjecting the impregnated material at elevated temperature to the action of a mild acid.

2. The method of dyeing a cellulosic material which comprises impregnating the material with a basic paste containing a water-soluble diazo-imino derivative of 3-chlor-6-methoxyaniline and a non-substantive acetoacetyl - naphthylamine and subjecting the impregnated material at elevated temperature to the action of a mild acid.

3. A cellulosic textile fabric dyed with the coupling product of a diazotized aniline and a non-substantive aceto-acetyl-naphthylamine.

4. A cellulosic textile fabric dyed with the coupling product of a diazotized 3-chlor-6-methoxy aniline and a non-substantive aceto-acetyl-naphthylamine.

EUGENE A. MARKUSH.